US008233490B2

(12) United States Patent  
Hundscheidt et al.

(10) Patent No.: US 8,233,490 B2  
(45) Date of Patent: Jul. 31, 2012

(54) METHOD FOR THE DISTRIBUTION OF A NETWORK TRAFFIC ACCORDING TO SLA AND QOS PARAMETERS

(75) Inventors: Frank Hundscheidt, Kerkrade (NL); Heino Hameleers, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 819 days.

(21) Appl. No.: 10/556,656

(22) PCT Filed: May 15, 2003

(86) PCT No.: PCT/EP03/05087  
§ 371 (c)(1),  
(2), (4) Date: Feb. 26, 2007

(87) PCT Pub. No.: WO2004/102896  
PCT Pub. Date: Nov. 25, 2004

(65) Prior Publication Data  
US 2007/0237078 A1    Oct. 11, 2007

(51) Int. Cl.  
*H04L 12/56* (2006.01)

(52) U.S. Cl. ............... 370/395.41; 370/235; 370/395.4; 370/468; 709/223; 709/226

(58) Field of Classification Search ............ 370/230, 370/230.1, 231, 232, 235, 352–356, 395.2, 370/395.21, 395.41, 395.43, 395.5, 395.52, 370/468, 477; 709/223–226, 228, 229  
See application file for complete search history.

(56) References Cited

U.S. PATENT DOCUMENTS

| 6,108,304 | A  | * | 8/2000  | Abe et al. ............... 370/232 |
| 6,549,533 | B1 | * | 4/2003  | Campbell ............... 370/351 |
| 6,577,597 | B1 | * | 6/2003  | Natarajan et al. ........ 370/232 |
| 6,789,118 | B1 | * | 9/2004  | Rao ......................... 709/225 |
| 7,031,297 | B1 | * | 4/2006  | Shabtay et al. .......... 370/352 |
| 7,062,642 | B1 | * | 6/2006  | Langrind et al. ........... 713/1 |
| 7,069,468 | B1 | * | 6/2006  | Olson et al. ................ 714/7 |
| 7,093,024 | B2 | * | 8/2006  | Craddock et al. ......... 709/238 |
| 7,161,942 | B2 | * | 1/2007  | Chen et al. ................ 370/392 |
| 2001/0027484 | A1 | * | 10/2001 | Nishi ...................... 709/223 |
| 2002/0041590 | A1 | * | 4/2002  | Donovan .................. 370/352 |
| 2002/0181462 | A1 | * | 12/2002 | Surdila et al. ............ 370/392 |
| 2003/0074443 | A1 |   | 4/2003  | Melaku et al. |
| 2003/0117954 | A1 | * | 6/2003  | De Neve et al. .......... 370/230 |
| 2004/0081092 | A1 | * | 4/2004  | Rhee et al. ............... 370/230 |

FOREIGN PATENT DOCUMENTS

| WO | WO 02/51052   | 6/2002 |
| WO | WO 02/51052 A | 6/2002 |

OTHER PUBLICATIONS

Berthou P et al: "Multimedia Multi-Networking: A New Concept Multi-Reseaux Multimedia: Un Nouveau Concept" Annales des Telecommunications—Annals of Telecommunications, Presses Polytechniques et Universitaires Romandes, Lausanne, CH, vol. 57, No. 7/8, Jul. 2002, pp. 721-750, XP001124785 ISSN: 0003-4347 section IV.

\* cited by examiner

*Primary Examiner* — Donald Mills

(57) ABSTRACT

The invention relates to a method, a bandwidth broker and an edge node for providing a predefined quality of service between two communication partners, wherein the quality of service is provided by means of a plurality of connections and a decentralised admission control.

13 Claims, 3 Drawing Sheets

METHOD FOR THE DISTRIBUTION OF A NETWORK TRAFFIC ACCORDING TO SLA AND QOS PARAMETERS

FIELD OF INVENTION

The invention relates to a method and nodes for providing a predefined quality of service for a connection between two communication partners.

DESCRIPTION OF PRIOR ART

Packet switched communications are increasing significantly, in particular in networks operating according to internet protocols. One problem occurring in packet switched networks is that in opposite to circuit switched networks a number of communication parameter as for example delay, jitter, bandwidth, packet loss can not be predicted. However, several services have minimum requirements on a connection wherein these requirements differ depending on the service. A voice connection is not sensitive to packet loss but to delay and jitter. The downloading of data, however, is sensitive to packet loss and data consistency but not to delay or jitter. As for example a voice connection with a delay of more than 2 seconds or jitter of more than 20 ms would not be accepted, at least minimum requirements have to be provided. Therefore to provide a predefined set of communication parameter values, the so-called quality of service has been introduced.

Quality of Service is the ability of a network or an element, e.g. an application, host, node or router, to have some level of assurance that its traffic and service requirements can be satisfied. To enable Quality of service requires the cooperation of all network layers from top-to-bottom, as well as every network element from end-to-end. Any Quality of service assurances are only as good as the weakest link in the "chain" between sender and receiver. For operation according to internet protocol Quality of service can be expressed as the combination of network imposed bandwidth, delay, jitter and reliability. Bandwidth is the transfer rate that can be sustained on a connection. Delay is the elapsed time for a packet between being sent at a starting point and being received at an end point of a connection. Jitter is the variation of delay values for different packets on a connection. Reliability is concerned with the reliability of transmission to deliver all the packets in the correct order, without dropping them or causing bit errors. Reliability is a property of the transmission system and is affected by the average error rate of the medium and by routing/switching design. In the Internet, packet loss is caused mainly by congestion. However, in wireless networks, both congestion and the unreliability of media must be considered. A further functional quality of service requirement can be security.

To comply to service requirements said requirements have to be translated into communication parameter values, such as bandwidth, delay, jitter, etc. These values must then be encoded into the applicable datalink protocols as for instance PPP, ATM and quality of service mechanisms and parameters for example IntServ (Integrated Services)/RSVP, DiffServ (Differentiated Services), ATM (Asynchronous Transfer Mode).

Quality of Service is implemented as the classification of packets for the purpose of treating certain classes or flows of packets in a particular way. Ideally, it means making the data delivery service of the otherwise unpredictable best effort IP (Internet Protocol) network, predictable.

Basically three levels of end-to-end Quality of service can be distinguished, best-effort service, that is basic connectivity without guarantees, differentiated service, i.e. statistical preference of packets but not a hard guarantee of particular communication parameter values, and guaranteed service as absolute reservation of network resources for specific traffic.

Hard guarantees lead to system resource under-utilization, but soft guarantees complicate application design.

Currently there are basically two models defined for enabling quality of service, DiffServ (Differentiated Services) and IntServ (Integrated Services). DiffServ provides markings within the IP packet headers to allow priorisation of traffic aggregates (i.e. "classes" of multiple flows). DiffServ is an attempt to design a simple architectural framework for Quality of service that can provide a variety of scalable end-to-end services across multiple separately administered domains without necessitating complex inter-provider business arrangements or complex behaviour in forwarding equipment.

IntServ is based on the Resource Reservation Protocol, which provides the signalling to enable network resource reservation on a per-flow basis according to the quantitative requirements of applications. Because the receivers make the reservation requests, different receivers can make heterogeneous requests for resources from the same source. IntServ specifies two fundamentally different types of resource reservation, guaranteed and controlled load. Guaranteed comes as close as possible to emulating a dedicated virtual circuit. It provides firm, mathematically provable, bounds on end-to-end queuing delays by combining the parameters from the various network elements in a path, in addition to ensuring bandwidth availability.

For Controlled load basically the client tells the network what traffic is to be expected and the network install resources accordingly. Any traffic beyond that can be treated as best effort as the corresponding resources were not reserved in advance and the resources may thus not be available. Controlled load tightly approximates the behavior visible to applications receiving best-effort service under so-called unloaded conditions from the same series of network elements. Unloaded conditions does not have the meaning of no traffic at all, but describes the situation of a network that is not heavily loaded and thus no congestin occurs. Assuming the network is functioning correctly, an application may assume that a very high percentage of transmitted packets will be successfully delivered by the network to the receiving end-nodes. The percentage of packets not successfully delivered must closely approximate the basic packet error rate of the transmission medium. Furthermore the transit delay experienced by a very high percentage of the delivered packets will not significantly exceed the minimum transmit delay experienced by any successfully delivered packet. This minimum transit delay includes speed-of-light delay plus the fixed processing time in routers and other communications devices along the path. To ensure that these conditions are met, clients requesting controlled-load service provide the intermediate network elements with a estimation of the data traffic they will generate; the TSpec. In return, the service ensures that network element resources adequate to process traffic falling within this descriptive envelope will be available to the client. Should the client's traffic generation properties fall outside of the region described by the TSpec parameters, the QoS provided to the client may exhibit characteristics indicative of overload, including large numbers of delayed or dropped packets. The service definition does not require that the precise characteristics of this overload behavior match those which would be received by a best-effort data flow traversing the same path under overloaded conditions. The controlled load service is intended to support a broad class of applications which have been developed for use in today's Internet, but are highly sensitive to overloaded conditions. Important members of this class are the "adaptive real-time applications" as described in Wroclawski Standards Track RFC 2211 Controlled-Load Network September 1997 offered by a number of vendors and researchers. These applications have been shown to work well on unloaded nets, but to degrade quickly under overloaded conditions. A service which mimics unloaded nets serves these applications well. The controlled-load service is intentionally minimal, in that there are no optional functions or capabilities in the specification. The service offers only a single function, and system and application designers can assume that all implementations will be identical in this respect. Internally, the controlled-load service is suited to a wide range of implementation techniques, including evolving scheduling and admission control algorithms that allow implementations to be highly efficient in the use of network resources. It is equally amenable to extremely simple implementation in circumstances where maximum utilization of network resources is not the only concern.

IntServ uses a token-bucket model to characterize its input/output queuing algorithm This is beneficial in case of e.g. a variable bit-rate video codec.

A Quality of Service policy defines the rules that determine the specifics of how, when and where Quality of service is applied to varying network traffic. To implement Quality of service policy in a network, a policy framework and architecture have been defined that identify the functionality required, the distribution of responsibilities, and the protocols required for policy-enabled network entities to fulfil them. The framework is based on the COPS (Common Open Policy Service) protocol and identifies two primary components, PDP (policy decision point) and PEP (policy enforcement point). A policy decision point controls a domain e.g. autonomous system, and makes decisions such as admission control based on the policies retrieved from a policy repository or other locations such as authentication servers. A policy enforcement point is a device, e.g. a router or a node that handles IP traffic and applies the actions according to policy decision point decisions. In general policy enforcement points send messages in the form of requests to the PDP, upon which the PDP replies with decisions.

Quality of service negotiation between two partners, e.g. customer and network provider or two network providers, is done via SLAs (Service Level Agreement)s. These SLAs spell out policy requirements for both partners. SLAs are specified in Service Level Specifications. A high level SLA is mapped to a detailed policy representation in order to be used by the different PDPs and PEPs. The IETF (Internet Engineering Task Force) internet draft "Service Level Specification Semantics, Parameters and negotiation requirements" of July 2000, discloses an example of an outline for the definition of a SLS format. Some examples of parameters in an SLS are scope, i.e. the domain to which the SLS applies, flow id, including the Differentiated Services Code Point, traffic conformance testing, that is specifying e.g. the token bucket parameters, excess treatment which specifies how to treat excess traffic, and performance guarantees which defines the service guarantees that the network offers to the corresponding packet stream. These are basically the quality of service parameters as discussed before (bandwidth, delay, jitter, and reliability).

For inter-domain traffic flows, the corresponding PDPs can negotiate the quality of service requirements, for example by means of the COPS protocol.

However, the described prior art is based on a centralised handling of quality of service requirements on connections between two communication partners. This can lead to a lack of operation reliability and flexibility.

SUMMARY OF THE INVENTION

It is therefore object of the invention to provide a method and means for providing a predefined quality of service between two communication partners, with increased reliability and flexibility.

A communication partner can be for example a client, a server, a domain, an operator, a node, a network or a computing device.

This is achieved by the method of claim 1, the edge node of claim 9, and the bandwidth broker of claim 13.

Advantageous is the plurality of connections and the distribution of the controlling. This avoids bottlenecks in connecting the two communication partners.

Further advantageous embodiments can be derived from the dependent claims

It is object of the invention to provide a method for providing a predefined quality of service between two communication partners, wherein the two communication partners can be connected by at least two connections, a first connection handled by a first entity and a second connection handled by a second entity. The method comprises the steps of defining a service level agreement in a service level specification, of distributing the service level agreement to the first and the second network entity, of controlling the first and the second network entity and thus ensuring that the sum of the provided quality of service on connections between the two communication partners does not exceed limits defined in the service level specification.

In an embodiment of the invention, the step of controlling is performed by a control node that is connected to the first and the second network entity.

In a further embodiment of the invention, the network entity is connected to and can be controlled by more than one control node and one control node controls more than one network entity. This has the advantage of further increasing the reliability of service provision.

The distribution may be performed by means of partitioning such that the first network entity handles a first kind of service requests and the second network entity handles a second kind of service requests. This is advantageous as not each node has to be adapted to provide all services and thus decreases investments into the network.

The distribution may also be performed by means of replication such that each of the first and the second network entities handles up to a certain share of the quality of service permitted by the service level agreement. The advantage of this embodiment is that any entity can handle any service and thus flexibility of the network is increased.

In an embodiment of the invention, the network entity is an edge node. For said embodiment a control node can be a bandwidth broker. For said embodiment, the bandwidth broker can communicate to edge nodes by using multicasting. Multicasting is a very efficient way of addressing a plurality of receivers.

The invention further relates to an edge node for providing a connection with a predefined quality of service between two communication partners. The edge node comprises a control unit for controlling the quality of service of the connection according to instructions received from a bandwidth broker, a storage for storing said instructions, and an input output unit for providing the connection and receiving said instructions.

The input output unit of the edge node may be further adapted to receive information from further edge nodes providing a connection between the communication partners and its control unit can be adapted to process the information according to instructions received from a bandwidth broker.

The control unit of the edge node can be adapted to control the quality of service of a connection according to instructions received from a further bandwidth broker and the input output unit can be adapted to receive said instructions.

The edge node can further comprise a charging unit for collecting charging information related to a connection.

It is further object of the invention to provide a bandwidth broker for providing a quality of service on at least one connection between two communication partners according to a service level agreement defined in at least one service level specification, comprising a control unit adapted to control an edge node to ensure that the quality of service provided on the connection does not exceed limits defined in the service level specification, and comprising an input output unit to communicate with the edge node.

The control unit of the bandwidth broker can be adapted to communicate with a further bandwidth broker and to negotiate a service level agreement with said further bandwidth broker.

The input output unit of the bandwidth broker can be adapted to communicate with edge nodes by means of multicasting.

DETAILED DESCRIPTION OF EMBODIMENTS

Figure 1:
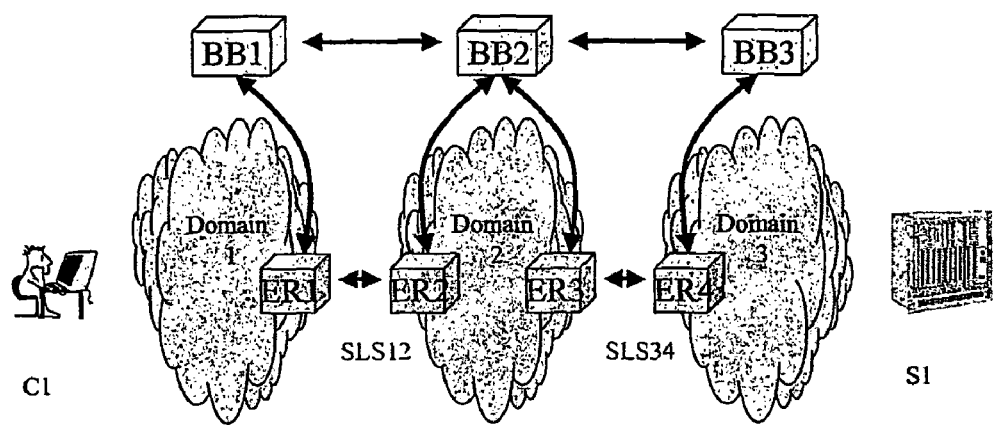
FIG. 1: depicts a connection between a client and a server as state of the art.

A distributed (de-centralized) system is a collection of independent nodes that appear to the users of the system or network as a single node. Distribution may denote any of the following two (scaling) techniques, partitioning and replication.

A service or resource is partitioned when it is provided by multiple nodes, each capable of handling a subset of the requests for service. A service or resource is replicated when it has multiple logically identical instances appearing on different nodes in a system.

Replicated resources need to be kept synchronized/consistent, i.e. any write access needs to be communicated to all the replicas. Synchronization may also be required in case of partitioning when the different partitions have to inform each other about updates or when the granularity of the updates involves the data of several partitions (note that the latter case can also be seen as a form of replication). There are basically two approaches for such synchronization, master/slave strategy and distributed update control.

In the master slave approach there is one primary server, holding the master copy, and several secondary servers for each replica. The master copy services all the update requests, whereas the slave replicas are updated by receiving changes from or by taking copies from the primary server. Clients can read data from both the master and the slave representatives. The primary server may be flexible or fixed. In case of a flexible primary server, writes can be done to any server. The corresponding server then takes the responsibility to update all replicas. This procedure is also called ROWA (Read-One-Write-All). In the case that a fixed server is used, also called simple ROWA, all writes have to be done to that server. Although this mechanism has a central point of failure, the primary server, the centralized control makes it relatively easy to resolve conflicts between requests and to maintain consistency. Several enhancements have been defined for both the flexible and fixed primary server models.

The distributed update control, also called voting, approach is more robust than the master/slave strategy in that no central point of failure is needed. The basic idea is to require clients to request and acquire the permission of multiple servers before either reading or writing a replicated file. The corresponding strategies are known as Quorum-Consensus mechanisms. Several variations have been defined, such as Uniform Majority Quorum-Consensus; permission from a majority of the servers needed for each write and read access; weighted Majority Quorum-Consensus; similar to the previous one, but now a server may have more than one vote e.g. reliable or high-speed servers; Voting with ghosts; a dummy a so-called ghost server is used for each server that is down. The ghost may only join a write quorum. This mechanism makes sure that a write quorum consensus is still possible in case a few servers are down since the write quorum often demands voting by of the most servers.

Several further mechanisms have been defined. The general strategy is always to reduce the size of the quorum for write and read accesses in order to speed up the synchronization process and reduce the network communication, and, to limit the impact of server failures e.g. voting with ghosts.

A Bandwidth Broker maintains information relating to Service Level Specifications that are defined between a DiffServ domain and its customers, where DiffServ domain denotes a region of shared trust, administration, provisioning, etc. Customers include local users as well as the adjacent networks that provide connectivity to other parts of e.g. the Internet. The internals of a DiffServ domain are not relevant to its customers, as long as the external obligations are fulfilled. The Bandwidth Broker uses this service level specification information to configure nodes, e.g. routers in the local DiffServ domain mainly the edge routers, and to make admission control decisions. The Bandwidth Broker is required to keep track of quality of service resources, make policy decisions based on service level specification information, and communicate policy enforcement information to the edge devices within the DiffServ domain. Furthermore, the bandwidth broker establishes and maintains service level agreements with neighbouring domains, i.e. domains that are connected to the domain.

The general idea is for a customer to buy from their provider a profile for higher quality service, and the provider polices marked traffic from the customer to ensure that the profile is not exceeded. Where providers peer, they arrange for an aggregate higher-quality profile to be provided, and police each other's aggregate if it exceeds the profile.

In this way, policing only needs to be performed at the edges to a provider's network based on the assumption that within the network there is sufficient capacity to cope with the amount of higher-quality traffic that has been sold.

In the following the invention is described in more detail by means of embodiments and figures. Equal reference signs indicate equal elements.

FIG. 1, state of the art, depicts a client C1 that is connected to a domain D1 comprising a bandwidth broker BB1 and an edge node ER1. The domain D1 is connected to a neighbouring domain D2 comprising a bandwidth broke BB2 and the edge nodes ER2 and ER3. Domain D2 is connected with the domain D3 comprising the edge node ER4, and the bandwidth broker BB3. Domain D3 is connected to the server. The neighbouring bandwidth broker BB1 and BB2, as well as BB2 and BB3 negotiate service level agreements. Each of the bandwidth brokers controls at least one edge node ER1, ER2, ER3, ER4 in its respective domain D1, D2, D3. Therefore a bandwidth broker sends a service level specification specifying the service level agreement to an edge node it controls. The neighbouring edge nodes ER1 and ER2, ER2 and ER3, ER3 and ER4 are also connected, wherein the connections between ER1 and ER2, and ER3 and ER4 are handled according to said service level specifications.

Before, if DiffServ is used, marked packets from the client C1 are admitted to the Diffserv domain D1, the client C1 must signal its local bandwidth broker BB1 to initiate a service reservation. The client is authenticated and subjected to local admission control policies. If the service reservation is admitted locally, the bandwidth broker BB1 initiates an end-to-end reservation request along the chain of bandwidth brokers BB2 and BB3 in the DiffServ networks to be traversed by the data flow. When a network-wide admission control decision has been made, the bandwidth broker BB1 will configure the node ER1, in the DiffServ domain D1 to support the requested service profile. The bandwidth broker BB1 allows the separately administered DiffServ domains D2 and D3 to manage their network resources ER2, ER3, and ER4 independently, yet still cooperate with other domains to provide dynamically allocated end-to-end quality of service.

Figure 2:
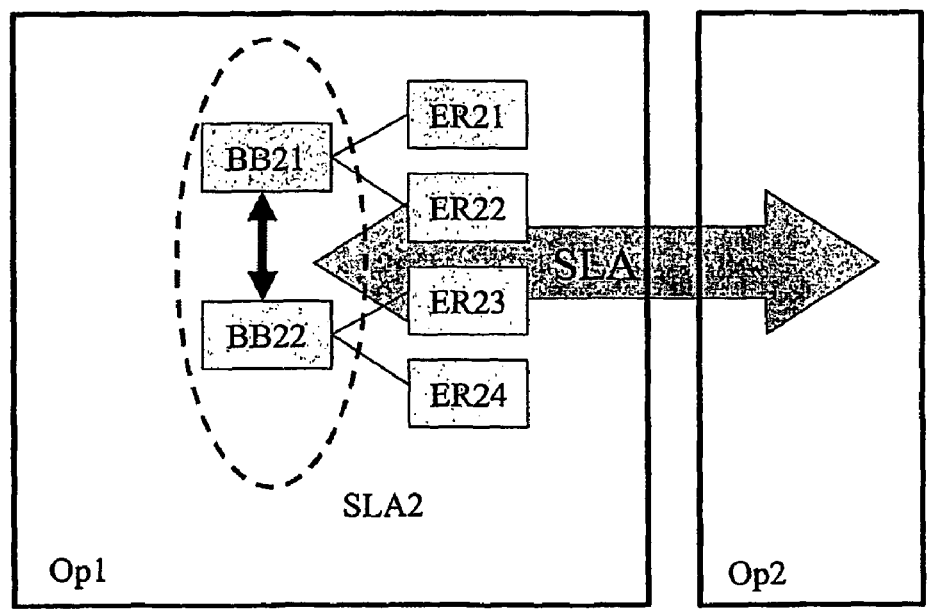
FIG. 2: depicts a part of a network according to the invention.

FIG. 2 depicts a part of a network according to the invention, wherein the network belongs to an operator Op1. The network comprises two bandwidth brokers BB21 and BB22 and four edge nodes ER21, ER22, ER23, and ER24. The edge nodes ER21 and ER22 are controlled by the bandwidth broker BB21 and the edge nodes ER23 and ER24 are controlled by the bandwidth broker BB22. The bandwidth brokers BB21 and BB22 negotiated a service level agreement with a further operators Op2 network.

It should be noted that BB21 and BB22 may additionally be in charge of other service level agreements.

In case of partitioning each of the bandwidth brokers BB21 and BB22 can take care of a certain percentage of the service level agreement/service level specification as long as the total does not exceed 100% of the whole service level agreement/service level specification. In case of replication each bandwidth broker can handle 100% of the whole service level agreement/service level specification as long as the total of all edge nodes together does not exceed 100% of the whole service level agreement/service level specification. Whether partitioning including the rules or replication is used, can be specified by the corresponding operator. The resource utilization rules in case of partitioning can be as complex as required. It can be specified for example that bandwidth broker BB21 is only allowed to allocate more than 30% of its resources for the service level agreement/service level specification when bandwidth broker BB22 has allocated more resources than a further bandwidth broker that is not shown in the figure for the same service level agreement/service level specification.

A new communication protocol is introduced from a central administration node to enable a distributed transfer of the service level agreement/service level specification information from this central administration node down to the bandwidth brokers. This protocol may be based on a push of events from the central administration node to the bandwidth brokers. The following exemplifies such a protocol.

From the central administration node to the bandwidth broker service level agreement/service level specification download message is sent with e.g. the following information contents: service level agreement/service level specification, distribution rules as replication or partitioning and the rules as described before, distribution partners, i.e. the addresses of the other bandwidth brokers for synchronization or communication. Furthermore this message may include the distribution mechanism and protocol, as described in the background chapter. This also includes the type of information to be sent, e.g. percentage used, increase/decrease, number of resources used and how often this information must be sent, i.e. the accuracy of the synchronization or communication, e.g. every 2% increase/decrease, every minute, etc.

In case unicast messages are used, a feedback message may be provided back to the central administration node. The information mentioned above can also be downloaded by means of IP (Internet Protocol) multicast, wherein reliable multicast is preferred. All the bandwidth brokers on the interface towards a domain can register in a dedicated multicast group. The downloading of the information can then easily and efficiently be done by sending the information to the corresponding multicast group. Reliable multicast is preferred because of the required reliability of the information transfer. Once all bandwidth brokers are registered for the multicast group, the multicast message distribution principle can also be used for the reliable transfer of synchronization and communication information between the bandwidth brokers. Because of multicast this will be very efficient, flexible and scalable.

The information to be exchanged during a synchronization or communication is basically specified above.

The mechanism also applies when multiple service level agreement/service level specification are used by multiple interfacing nodes. Above the interfacing nodes were exemplified as bandwidth broker, but in general this can be many types of nodes, such as an mobile services switching centre server with media gateways, serving GPRS (General Packer Radio Service) support node with Gateway GPRS support node (, etc. For such many-to-many relations the dependencies between different service level agreement/service level specification can be handled transparent for the network operator. Different service level agreement/service level specification can either mean for different domains or different types of service level agreement/service level specification for the same domain. Although the service level agreement/service level specification information is distributed, the total picture is known and can be used for dependency decisions between the service level agreement/service level specification, such as prioritization in case of overload/congestion, etc.

This also applies when different sets of interfacing nodes are used for each of the service level agreement/service level specification. For example a first service level agreement/service level specification uses a first, a second and a third media gateway, whereas a second service level agreement/service level specification uses the first, the second and a forth media gateway. The first and the second media gateway are able to consider the whole status for both service level agreement/service level specification when making admission control and policy management decisions.

Optionally, interfacing nodes can request additional resources from other interfacing nodes. This can be done by sending or multicasting a resource request message to the other interfacing nodes, specifying the amount of additional resources that this interfacing node would like to allocate. The other interfacing nodes can then reply with a simple "yes, allowed" or with the amount of resources that they will not allocate, but that the requesting node can then allocate instead.

Also optionally, there is a many-to-many relation between the bandwidth brokers and the edge nodes. I.e. the bandwidth broker and the edge nodes are meshed or even fully meshed. In such a scenario a first bandwidth broker could e.g. ask to temporarily use an edge node, which is in principle under the control of a second bandwidth broker. This may be handled by a simple resource-request and reply between the corresponding bandwidth brokers. Charging related information can be provided to be able to charge for the use of devices in case multiple operators are affected.

Figure 3:
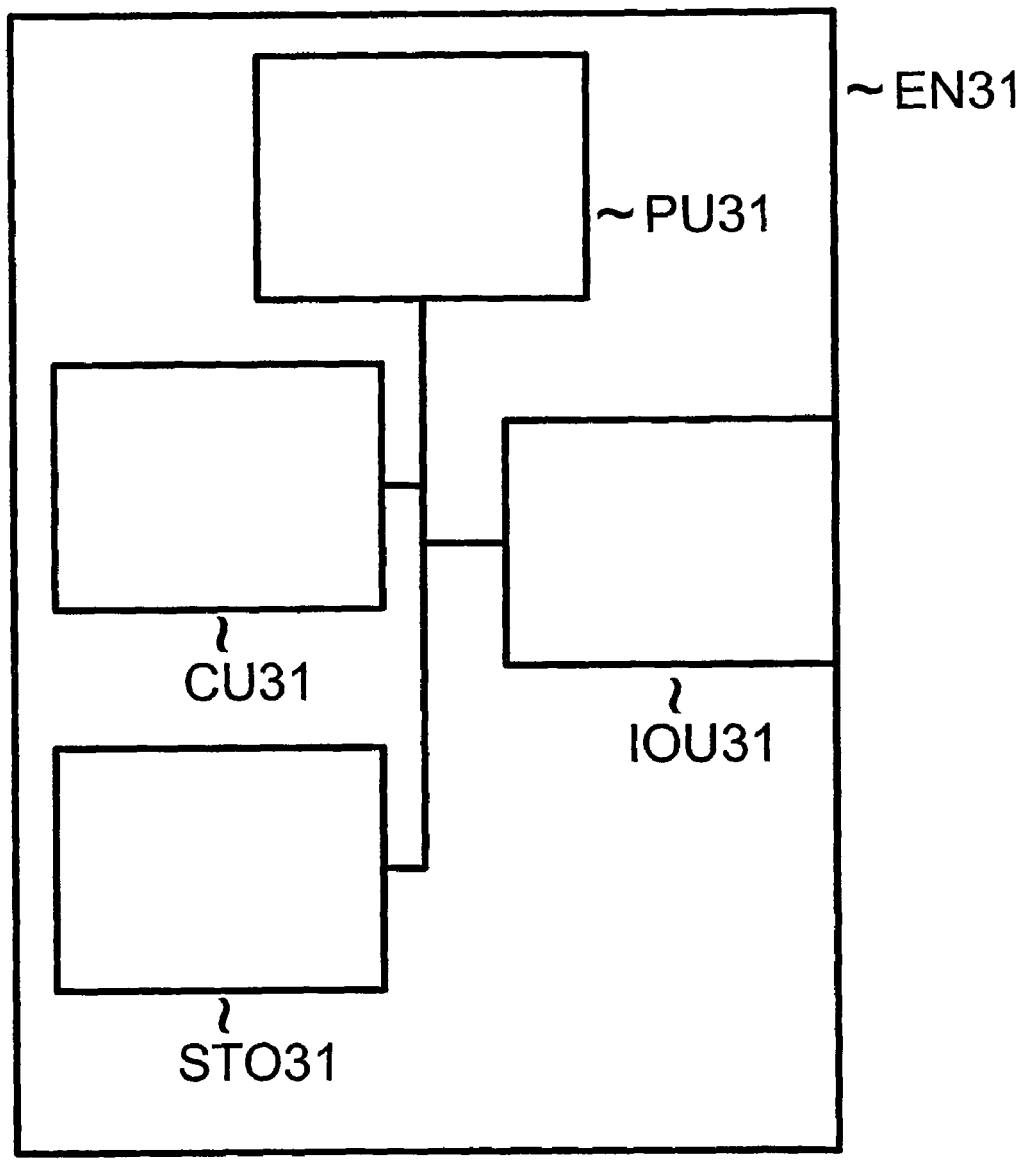
FIG. 3: depicts an edge node according to the invention.

FIG. 3 depicts an edge node EN31 according to the invention, comprising a control unit PU31 for controlling the quality of service of the connection according to instructions received from a bandwidth broker, a storage STO31 for storing said instructions, an input/output unit IOU31 for providing the connection and receiving said instructions, and a charging unit CU31 for collecting charging information related to a connection.

The input output unit can be further adapted to receive information from further edge nodes providing a connection between the communication partners and the control unit is adapted to process the information according to instructions received from a bandwidth broker.

The control unit can be adapted to control the quality of service of a connection according to instructions received from a further bandwidth broker and the input output unit can be adapted to receive said instructions.

Each of the units can be implemented by means of hardware, a software module or a combination of both.

Figure 4:
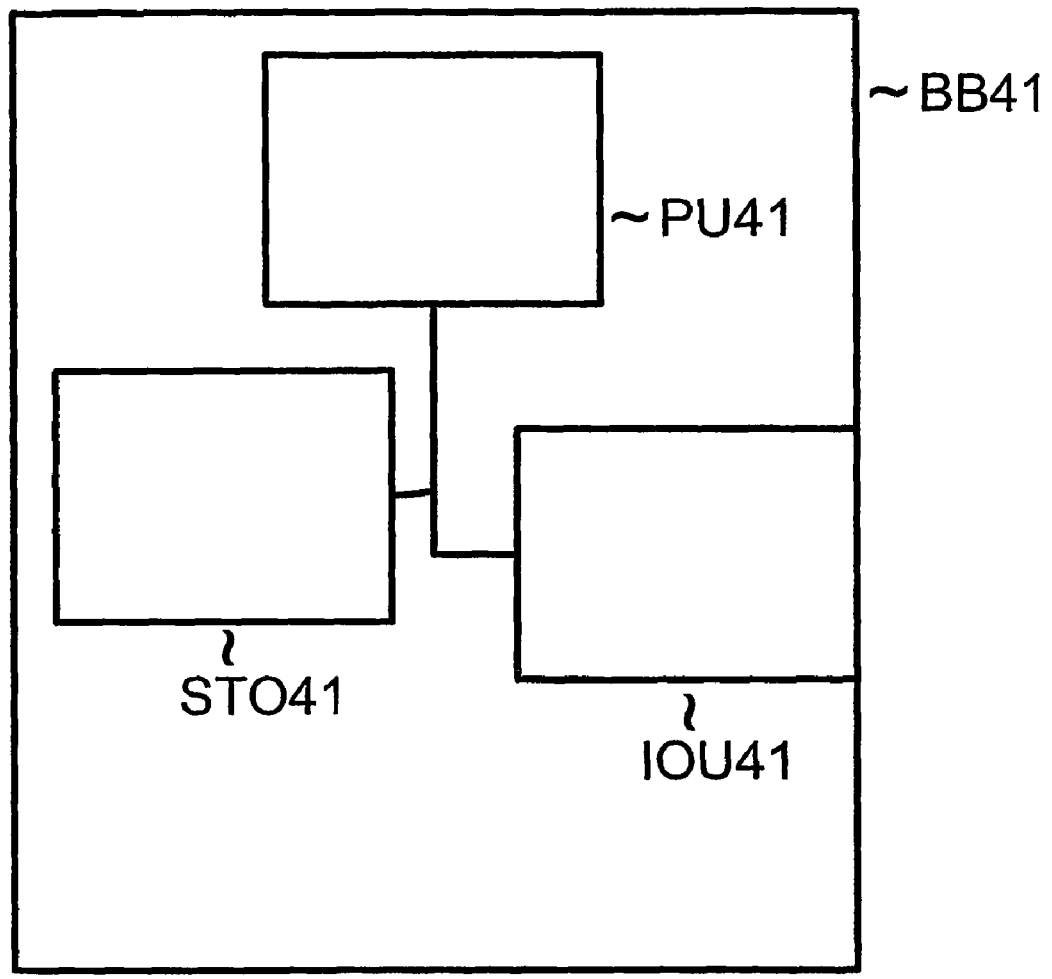
FIG. 4: depicts a bandwidth broker according to the invention.

FIG. 4 depicts a bandwidth broker BB41 according to the invention. The bandwidth broker BB41 comprising a control unit PU41 adapted to control edge nodes to ensure that the quality of service provided on the connections does not exceed limits defined in the service specification, a storage STO41 for storing the service specification and an input output unit IOU41 to communicate with the edge node.

The control unit can be adapted to communicate with a further bandwidth broker and to negotiate a service level agreement with said further bandwidth broker.

The input output unit can be adapted to communicate with edge nodes by means of multicasting.

The invention claimed is:

1. A method for providing a predefined quality of service between two communication partners, wherein the two communication partners are connected by at least two connections, a first connection handled by a first network edge node and a second connection handled by a second network edge node, the method comprising the steps of:
   maintaining information, by a bandwidth broker, relating to a service level agreement in a service level specification (SLA/SLS);
   distributing the service level specification (SLS), via an input output unit of the bandwidth broker, to the first and the second network edge node by partitioning or replicating the SLS; and
   controlling the first and the second network edge node to ensure that the sum of the provided quality of service on said connections between the two communication partners does not exceed limits defined in the service level specification.

2. The method according to claim 1, wherein the step of controlling is performed by the bandwidth broker that is connected to the first and the second network edge node.

3. The method according to claim 1, wherein at least one of said first and second network edge node is connected to and adapted to be controlled by more than one bandwidth broker.

4. The method according to claim 1, wherein in case of partitioning the first network edge node handles a first kind of service request and the second network edge node handles a second kind of service requests.

5. The method according to claim 1, wherein in case of replication each of the first and the second network edge node handles up to a certain share of the quality of service permitted by the service level agreement.

6. The method according to claim 1, wherein the bandwidth broker communicates to edge nodes by using multicasting.

7. An edge node for providing a connection with a predefined quality of service between two communication partners, comprising:
   a control unit for controlling the quality of service of the connection according to instructions received from a bandwidth broker, a storage for storing said instructions, and
   an input output unit for providing the connection and receiving said instructions,
      wherein the instructions received from the bandwidth broker represent a partitioned or replicated service level specification; and
      the edge node is adapted for controlling the quality of service on said connection based on said received partitioned or replicated service level specification for ensuring that the sum of the provided quality of service on said connections between the two communication partners does not exceed limits defined in the service level specification.

8. The edge node according to claim 7, wherein the input output unit is further adapted to receive information from further edge nodes providing a further connection between the communication partners and wherein the control unit is adapted to process the information according to instructions received from the bandwidth broker.

9. The edge node according to claim 7, wherein the control unit is adapted to control the quality of service of the connection according to instructions received from a further bandwidth broker and the input output unit is adapted to receive said instructions.

10. The edge node according to claim 7, further comprising a charging unit for collecting charging information related to the connection.

11. A bandwidth broker of a network, wherein the bandwidth broker is embodied to provide a quality of service between two communication partners, wherein the two communication partners are connected by at least two connections, a first connection handled by a first network edge node and a second connection handled by a second network edge node, according to a service level agreement defined in at least one service level specification (SLA/SLS); and
   the bandwidth broker comprising:
      a storage for storing the service level specification;
      an input output unit for distributing the service level specification by means of partitioning or by means of replication to a first and a second network edge node handling said at least two connections; and
      a control unit adapted to control said first and second network edge node to ensure that the sum of the provided quality of service provided on the connections between the two communication partners does not exceed limits defined in the service level specification.

12. The bandwidth broker according to claim 11, wherein the control unit is adapted to communicate with a further bandwidth broker and to negotiate the service level agreement with said further bandwidth broker.

13. The bandwidth broker according to claim 11, wherein the input output unit is adapted to communicate with said network edge nodes by means of multicasting.

* * * * *

UNITED STATES PATENT AND TRADEMARK OFFICE
CERTIFICATE OF CORRECTION

PATENT NO. : 8,233,490 B2
APPLICATION NO. : 10/556656
DATED : July 31, 2012
INVENTOR(S) : Hundscheidt et al.

It is certified that error appears in the above-identified patent and that said Letters Patent is hereby corrected as shown below:

In Column 2, Line 10, delete "priorisation" and insert -- prioritization --, therefor.

In Column 2, Line 41, delete "congestin" and insert -- congestion --, therefor.

In Column 4, Line 19, delete "claims" and insert -- claims. --, therefor.

In Column 8, Line 40, delete "node (," and insert -- node (GGSN), --, therefor.

Signed and Sealed this
Twelfth Day of February, 2013

Teresa Stanek Rea
*Acting Director of the United States Patent and Trademark Office*